United States Patent [19]

Müller

[11] 4,390,168
[45] Jun. 28, 1983

[54] CRANE AND HOIST FOR STEEL MANUFACTURING MILL

[75] Inventor: Johannes Müller, Dusseldorf, Fed. Rep. of Germany

[73] Assignee: Mannesmann Aktiengesellschaft, Dusseldorf, Fed. Rep. of Germany

[21] Appl. No.: 324,587

[22] Filed: Nov. 24, 1981

[30] Foreign Application Priority Data

Nov. 25, 1980 [DE] Fed. Rep. of Germany ....... 3044258

[51] Int. Cl.³ .............................................. C21C 5/52
[52] U.S. Cl. .................................................. 266/142
[58] Field of Search ................................ 266/142, 143

[56] References Cited
U.S. PATENT DOCUMENTS 2,799,492 7/1957 Höbenreich et al. ............... 266/142
3,746,325 7/1973 Freeberg et al. ................... 266/143
3,819,161 6/1974 Hubatsch ........................... 266/143

FOREIGN PATENT DOCUMENTS 2340693 2/1975 Fed. Rep. of Germany ...... 266/142

Primary Examiner—L. Dewayne Rutledge
Assistant Examiner—Christopher W. Brody
Attorney, Agent, or Firm—Mandeville & Schweitzer

[57] ABSTRACT

In a steel manufacturing mill, two opposed furnaces are provided with a turntable located between the furnaces. The turntable supports and rotates casting ladles which are filled from the output of the furnaces. The present disclosure is specifically related to the provision of a hoisting crane in the furnace area which has its longitudinal axis in a vertical plane passing through the central axis of the two furnaces.

2 Claims, 2 Drawing Figures

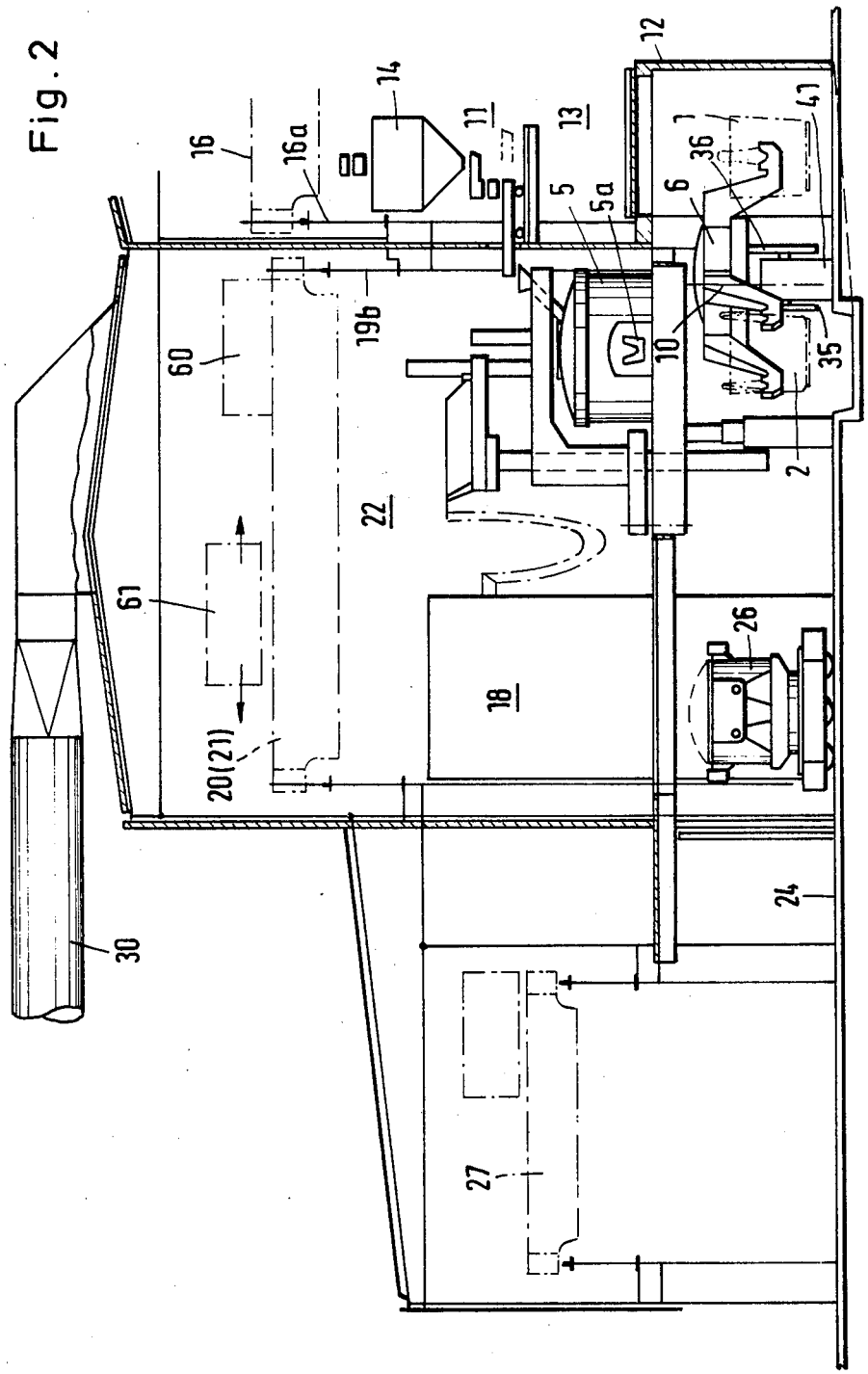

CRANE AND HOIST FOR STEEL MANUFACTURING MILL

BACKGROUND OF THE INVENTION AND DESCRIPTION OF THE PRIOR ART

An apparatus for first filling a casting ladle from a smelting furnace, particularly from an electro-smelting furnace, and then transferring the just filled ladle to a casting stand is shown in German reference No. 2,340,693. As shown therein, one or more smelting furnaces are arranged in a furnace hall having an adjoining but physically separate transferral hall. Located within the transferral hall is a movable crane for transporting the casting ladle. A vertically rotatable turntable-type element located between the smelting furnaces in the furnace hall serves to support a casting ladle and rotate the ladel into the flow path for tapping of the steel. The turntable-type element is also rotatable, with the casting ladle supported thereon, into the working area of the crane, which as mentioned, is located in the transferral hall. The installation shown by the reference is characterized by the arrangement of the rotating turntable-type element being located between the two smelting furnaces with the drains or tap holes of the furnaces facing the rotatable element.

Material charging cranes and furnace erection cranes are provided in the furnace hall of the steel manufacturing mill. These cranes are movably arranged in the furnace hall. The cranes are provided with conventional crane trolleys which ride on rails for movement. These cranes essentially serve to transport charging vessels, particularly scrap metal-laden buckets. The cranes can also be used for transporting smaller structural elements which may be required for a repair job in the furnace hall.

In practice, the crane trolleys of these material charging and furnace erection cranes are, for reasons of economy, of a lightweight construction. The crane trolleys are, therefore, correspondingly designed, i.e., they are configured in a particular way due to their relative lightweight construction. If, however, heavier elements, for example, differing furnace vessels, are to be moved about the furnace hall for purposes of their maintenance or for changing their size, two or more of the cranes are simultaneously employed in order to spread the load over the two cranes, since the relative heavy load is excessive for a single lightweight crane acting alone.

Operating difficulties occur, however, when molten, i.e., liquid bulk, is to be moved in the heavy vessels. In that situation, the simultaneous use of two or more of the cranes, where the speed and directions of movement may not be completely synchronized results in the high risk of spillage of the molten bulk. However, the use of a single crane trolley, itself arranged in the furnace hall, is also not capable for the purpose of transporting a furnace vessel having molten liquid therein because the carrying capacity of the single crane trolley is generally insufficient to support the relative heavy load.

The necessity and desirability of moving a heavy, heat-variable furnace vessel occurs, for example, when a full ladle is returned back to the furnace hall because of a production breakdown, either mechanical or otherwise, in the foundry so that the charge must be poured back into the furnace in order to keep it at a particular temperature.

Apart from the insufficient carrying capacity of crane trolleys of lighter construction, the prescribed safety equipment used for the handling of molten material is not present with the trolleys. For example, the arrangement of special brakes, support equipment at the hoisting installation, heat-protection equipment, etc. are not present in standard trolley installations.

SUMMARY OF THE INVENTION

The object of the present invention is to avoid temporarily overloading of the transport mechanisms, in a steel manufacturing mill and, particularly, to find a simple and efficient means of transporting heavy heat-variable furnace vessels often containing molten material.

The problem existing in the prior art is solved, according to the present invention, by providing, in the furnace hall, at least one more additional crane having a crane trolley, in addition to the single crane arranged in the transferral hall. A hoisting installation, firmly arranged on the bridge of the additional crane, is provided so that its longitudinal axis is in a vertical plane extending through the center of the two smelting furnaces which are arranged facing one another.

A further characteristic of the present invention is that the hoisting installation is encircled by the crane trolley which is, itself, designed like a bridge member.

The present invention thus renders it possible to transport heavy furnace vessels with molten or liquid bulk material or heavy assembly elements in the direction of the center axis of the smelting furnaces with the aid of only a single crane. The crane does not have to be reinforced to accomplish the desired result because the rigid connection of the crane bridge with the hoisting installation is relatively light in weight, and it, therefore, represents a unit of sufficient carrying capacity.

In order for the crane trolley to be moved, if necessary, across the furnace area, it, too, may be constructed like a bridge member so that it may be moved beyond the hoisting installation.

The additional hoisting installation can also be used if emergency situations arise, such as, for example, lifting of a filled slag vat (which would be located behind the furnace) onto a standard platform carriage which, itself, is not equipped with any special loading gear. Such emergency situations occur, for instance, when a disruption or breakdown occurs in the operation of the customarily used hall vehicles in removing the slag vats. The use of the additional hoisting installation may, in some instances, obviate the need for use of the special, relatively expensive, movable transferring apparatus specially designed for transporting slag vats.

Also, if trouble occurs at one of the receiving stations of the pivotal ladle-transferring turntable-type apparatus, the suspended casting ladles may be directly moved to the tapping position of one or the other furnace by the hoisting gear. Additionally, after the casting ladles have been filled, the casting ladles can be rotated into the area of the transferral hall.

If the arc steel making furnaces are to be charged with scrap metal instead of other iron-containing raw materials, a greater number of transferral points for the scrap buckets in the furnace hall will be used. In addition to the already provided transport apparatus for the scrap buckets, the overhead crane, with the firmly mounted hoisting installation, may be used for transporting the buckets.

An exemplary embodiment of the invention is represented in the drawing and is further detailed below:

BRIEF DESCRIPTION OF THE DRAWINGS

FIG. 2 is a partial cross sectional view of the steel manufacturing mill shown in FIG. 1, the view being taken looking at the location of one electro-smelting furnace.

DETAILED DESCRIPTION OF THE DRAWINGS

Figure 1:
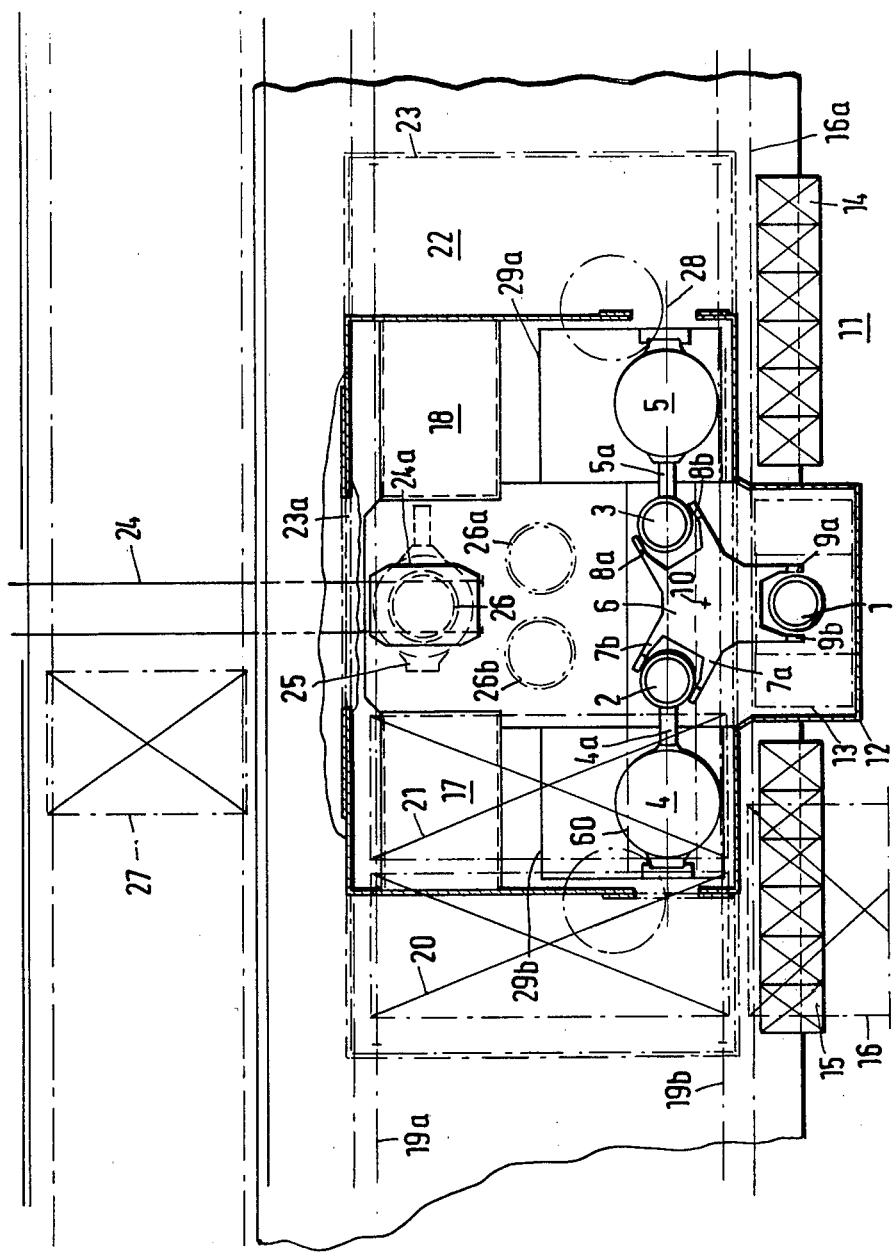
FIG. 1 is a top plan view of an electro-steel manufacturing mill having two electro-smelting furnaces.

As shown in FIG. 1, the three casting ladles 1, 2 and 3 are arranged in the electro-steel manufacturing mill on an apparatus 6, similar to a "lazy susan" type rotatable turntable, rotating with support arms 7a and 7b, 8a and 8b, and 9a and 9b. Turntable 6 is located between the two electro-smelting furnaces 4 and 5. The support arms of the apparatus 6 are rotatable around the perpendicular-to-the-floor central axis 10. The electro-smelting furnaces 4 and 5, with their tap holes or drains 4a and 5a facing one another are tiltable in the direction of the casting ladles 2 and 3.

FIG. 1 also shows the general type of arrangement of the more important elements of the steel manufacturing mill. The casting ladle 1, located in the transferral hall 11, protrudes from the furnace hall 22 into a room area 12. Room area 12 has removable overhead crane hatch plates 13. Located at the left and the right of the hatch plates 13 are the charging material bins 14 or, if desirable, additional charging material bins 15.

An overhead crane 16 moves in the transferral hall 11; one of the crane rails, 16a, being illustrated. Furnace housings 17 and 18 are arranged behind each of the electro-smelting furnaces 4 and 5. Located above the electro-smelting furnaces 4 and 5, are material charging and assembly cranes 20 and 21. These latter cranes travel on rails 19a and 19b. The cranes are each provided with a crane trolley 61 moving on the crane bridge support structure.

An additional hoisting installation 60 is secured to the crane bridge and is provided above the center of the furnace 4 and above furnace 5, with the longitudinal axis of the hoisting installation being in a vertical plane extending through the centers of the smelting furnaces 4 and 5. The longitudinal axis of the hoisting mechanism, as can be seen from FIGS. 1 and 2, is the axis of the hoist which is aligned with the centers of the furnaces 4 and 5. The longitudinal axis of the hoisting mechanism passes through the body of the lifting device and is parallel to the direction of travel of the crane trolley. With the aid of the hoisting installation 60, various items, for example, casting ladles, furnace vessels, full slag buckets, or the like may be easily and efficiently transported.

The furnace hall 22 is enclosed by a sound limiting cabinet 23 which itself is provided with a doorway 23a through which a vessel-carrying vehicle 24a can pass. Vehicle 24a is capable of carrying for exchange purposes a complete furnace vessel 25. Vehicle 24a is movable on tracks 24 which extend into the installation. The vessel-carrying vehicle 24a can also serve to transport scrap buckets 26 (see FIG. 2). Two of such buckets, 26a and 26b (see FIG. 1) are shown deposited in front of the turntable 6. The scrap buckets 26 are transferred onto and off of the vessel-carrying vehicle 24a by means of another crane 27. The crane 27 can also serve to transport and exchange vessels 25 onto and off of the vessel-carrying vehicle 24a.

Overhead crane 21, with the firmly arranged hoisting installation 60, is used for the additional transport of slag buckets.

According to FIG. 2, the parts of the steel manufacturing mill represented in FIG. 1 and explained above are viewed from the side. This, too, shows the position of the additional hoisting installation 60.

I claim:

1. In a steel manufacturing mill comprising:
   (a) a furnace hall area having at least one first movable hoisting crane riding on a first trolley;
   (b) a transferral hall area separate from said furnace hall area;
   (c) said transferral hall area being provided with a second movable hoisting crane riding on a second trolley;
   (d) two or more smelting furnaces located in said furnace hall area;
   (e) each of said furnaces being provided with a tap hole;
   (f) the tap holes of said furnaces facing one another;
   (g) a rotatable, turntable-type element located between said furnaces proximal to said tap holes;
   (h) a plurality of casting ladles rotatively supported by said turntable-type element;
   (i) said turntable-type element serving to selectively rotate said individual casting ladles from a first position proximal to one of said tap holes to a second position within said transferral hall area proximal to said second movable hoisting crane; the improvement characterized by
   (j) said first movable hoisting crane riding on said first trolley being provided with a hoisting means which is stationary with respect to said first trolley yet movable with respect to said furnaces by moving with said first trolley; and
   (k) the longitudinal axis of said hoisting means being in a vertical plane extending through the centers of said smelting furnaces.

2. A steel manufacturing mill as claimed in claim 1, wherein:
   (a) said hoisting means is supported by a bridge member of said first movable hoisting crane;
   (b) said hoisting means is surrounded by said first crane trolley; and
   (c) said bridge member connects said hoisting means to said first crane trolley.

* * * * *